F. H. GILSON.
GRAPHIC ROUTE GUIDE SYMBOL.
APPLICATION FILED JAN. 28, 1916.

1,199,368.  Patented Sept. 26, 1916.

Fig. 1 — ROUTE 441

| | | |
|---|---|---|
| 39.3 | 1.4 | Just above concrete bridge |
| | 1⤴ | (Straight on is Route 451 to Fitchburg.) 21 |
| 42.5 | 3.2 | West Townsend Sta. ⚐, fine macadam. |
| 44.1 | 1.6 | Townsend. Common on left ⚐.25 |
| 45.9 | 1.8 | Townsend Harbor Sta. ⚐. |
| 50.1 | 4.2 | Sign "Groton" 8 Y ⚐. |
| 50.5 | 0.4 | Nashua River ⚐ ⚐. 23 |
| 51.3 | 0.8 | ⚐ 22   24  2 |
| 52.1 | 0.8 | Groton ✝.11 |
| 52.3 | 0.2 | Groton Inn on left. |
| 52.4 | 0.1 | ⚐.4 |
| 52.8 | 0.4 | 7 Y Fine macadam ⚐. |
| 56.3 | 3.5 | ⚐ 21 |
| 56.8 | 0.5 | North Littleton ⚐.23 |
| 58.8 | 2 | 7 Y :. |
| 59.2 | 0.4 | Littleton Common ✝.11 |
| 61.8 | 2.6 | Lake Nagog on right. |
| 62.1 | 0.3 | North Acton; village to right, Lake Nagog Inn on left ⚐.25 |

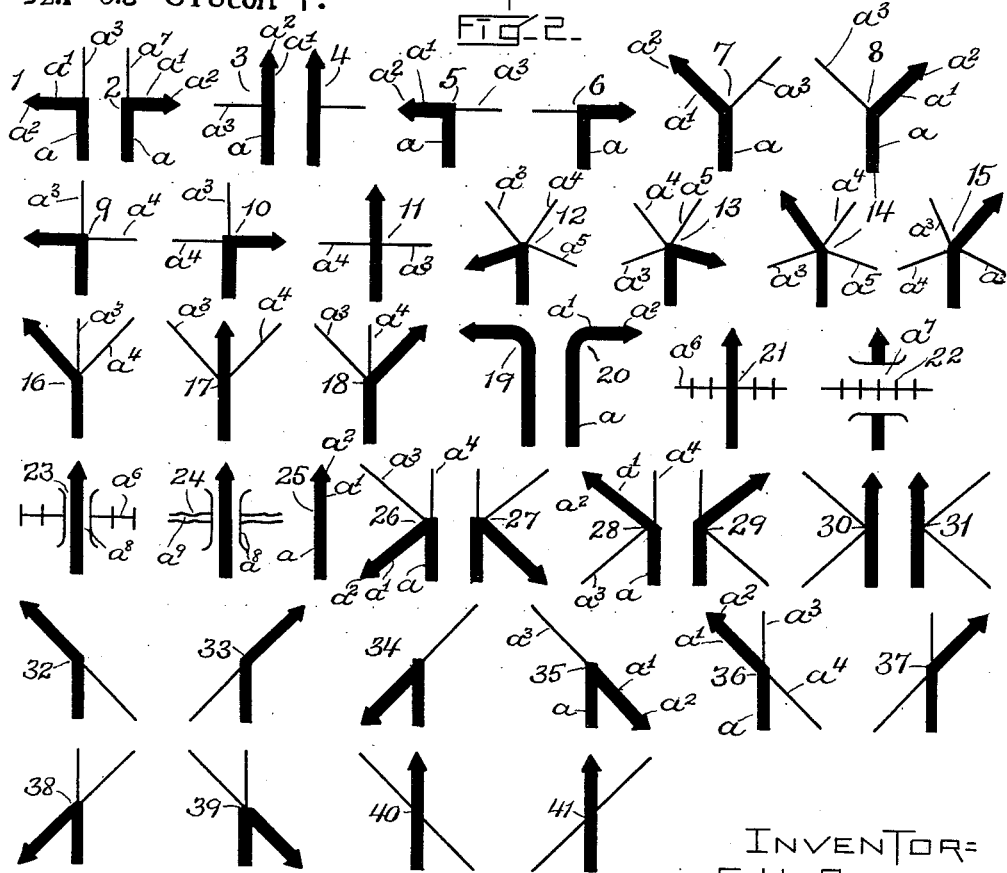

Fig. 2.

INVENTOR:
F. H. GILSON
by [signature]
ATTORNEYS

UNITED STATES PATENT OFFICE.

FRANKLIN H. GILSON, OF WELLESLEY HILLS, MASSACHUSETTS, ASSIGNOR TO F. H. GILSON COMPANY, OF BOSTON, MASSACHUSETTS, A CORPORATION OF MASSACHUSETTS.

GRAPHIC ROUTE-GUIDE SYMBOL.

1,199,368. Specification of Letters Patent. Patented Sept. 26, 1916.

Application filed January 28, 1916. Serial No. 74,773.

*To all whom it may concern:*

Be it known that I, FRANKLIN H. GILSON, a citizen of the United States, residing at Wellesley Hills, in the county of Norfolk and State of Massachusetts, have invented new and useful Improvements in Graphic Route-Guide Symbols, of which the following is a specification.

The object of the present invention is to provide a series or set of graphic symbols adapted to be formed as printing types and to be printed with other characters upon a page for use in connection with directions for travel in route charts or guides.

My main object is to simplify the route guide by substituting conventional symbols in place of words for certain directions which have heretofore been given in words, thereby making it possible for the user of the guide to grasp the directions more quickly and accurately, and enabling the guide or chart for a certain route to be condensed, thereby making the guide as a whole less bulky, or leaving space which may be utilized for other purposes if desired.

Specifically the invention consists in symbols which represent roads and show graphically both the direction in which the traveler has traveled in arriving at a given point, the direction in which he is to proceed from such point, and the road or roads to be avoided.

My invention provides symbols showing graphically, but conventionally, the direction of a road and the relative positions of intersecting roads at specific points, including all possible arrangements of roads, and includes the idea of so placing the symbol upon the printed or written page as to indicate correctly the direction in which the traveler is headed and the directions in which the road to be followed, and those to be avoided, extend from the point indicated on the chart.

My invention is intended to be used in connection with any of the guides that have already been prepared of roads and routes to be followed in traveling from one place to another, in substitution for the words which have hitherto been generally used for giving traveling directions at points where the traveler is liable to go astray. It is my object to indicate, by means of the graphic symbols which I have invented, not only the road to be followed at such a point, but also all roads intersecting at that point which are to be avoided, and also the direction in which the traveler is moving in reaching the point.

In the accompanying drawings I have shown a set of symbols in which my invention is embodied and illustrated the manner of use thereof.

Figure 1 is the reproduction of part of a route chart or guide in which my symbols are incorporated for the purpose of giving traveling directions graphically instead of by the use of words. Fig. 2 represents a set of the symbols applicable to different arrangements of roads or routes.

Referring first to Fig. 2, I have given each of the symbols a distinctive reference character, and to each part of the symbol a distinctive character. All of the symbols have corresponding parts and in all the same reference characters are used to designate such corresponding parts.

The symbol which is designated as a whole by the number 1 represents an intersection where a side road meets a through road at an abrupt angle. This gives the direction to the traveler to turn left on the branch road and to avoid the continuation of the through road beyond the branching point. Of the several parts of the symbol $a$ represents the lower part or base which is intended to represent the direction from which the traveler approaches the point of intersection; $a'$ represents the road to be traveled; and $a^2$ is a direction indicator, here shown as a conventional arrow head, which indicates the direction of travel after passing the intersecting point. $a^3$ represents the route to be avoided in passing the intersection. The road just traveled over and the road to be followed are designated by relatively heavy lines while the road to be avoided is designated by a light line, whereby the traveler is able at a glance to grasp the instructions intended to be conveyed by the symbol. In printing or drawing, or otherwise applying these symbols upon a page or card, I place them so that the part $a$ is upright and extends from the point of intersection toward the bottom of the page or card. Therefore when the page or card is held by the user in the manner in which he would naturally hold a paper containing reading matter for the purpose of reading it, and faces in the direction of his travel toward the point of intersection, the symbol represents graphically the relative arrangement and directions of the roads as they actually appear to the traveler at that point. The part $a$ of the symbol then extends in the direction in which the traveler has advanced and is now facing, the part $a'$ and the direction indicator $a^2$ extend in approximately the direction of the road to be followed, and the part $a^3$ extends in approximately the direction of the road to be avoided. The symbol thus conveys at a glance to the user the information which he desires as to the course to follow beyond the point of intersection, and it does this automatically, because the points of the symbol correspond with the lay out of the roads. The user naturally holds the page or card in the proper relation to the actual terrain, and indeed when traveling by vehicle, it is difficult to hold it in any other manner. The important thing is that, by the arrangement of the symbol on the page, the exact relative arrangement of roads is represented to the traveler and it is unnecessary for him to translate written words into a visualization of the scene, as is necessary when directions are given in words; or to transpose directions, as is necessary when a map is used and the traveler faces in any other direction than that with respect to which the map is oriented.

The symbol 2 indicates a condition where a branch leads abruptly to the right and gives the direction to turn toward the right. Symbols 3 and 4 give the direction to go straight ahead where there is a branch to the left and to the right respectively. Symbols 5 and 6 represent the end of a road at a crossroad and direct the traveler to the left, and to the right, respectively. Symbols 7 and 8 represent a fork, symbol 7 directing the traveler to take the left hand branch and symbol 8 the right hand branch. Symbols 9, 10, and 11 represent a crossroad or four corners where the intersecting roads are approximately perpendicular. Each represents in an obvious manner a different direction to be followed and indicates all the roads to be avoided. The latter are represented in each of these symbols by $a^3$ and $a^4$. Symbols 12, 13, 14, and 15 represent five corners, or a point where five roads intersect. The directions given are respectively to turn sharp left, turn sharp right, bear left, and bear right, respectively. In each of these symbols the characters $a^3$, $a^4$, and $a^5$ represent the roads to be avoided. Symbols 16, 17, and 18 represent a fork of three branches, and, respectively, direct the traveler to bear left; to take the middle road, avoiding both branches to right and left; and to take the right hand branch. The characters $a^3$ and $a^4$ in each symbol represent the roads to avoid. Symbols 19, 20, and 25 represent conditions in which either there is no intersection of roads, or roads actually existing are not noted on the chart, and it is desired nevertheless to give directions. Of these symbols 19 directs the traveler to curve to the left, 20 to curve to the right, and 25 to pass straight on. Symbols 21, 22, and 23 represent railroad crossings and show, respectively, a grade crossing, a crossing under a railroad bridge, and a crossing on a bridge over the railroad. In these symbols $a^6$ represents the railroad track, $a^7$ the railroad bridge under which the road passes, and $a^8$ the bridge over the railroad for the road. The same characters represent the other parts of the symbol as are used elsewhere and have been previously described. Symbol 24 represents a bridge over a stream, where the wavy line $a^9$ indicates the stream. The remaining symbols numbered consecutively from 26 to 41 indicate various conditions of crossroads and other intersections at other than right angles, and are presented to show how the basic principle of the invention may be extended and adapted to cover all actual conditions as to directions and arrangements of roads which may be encountered. In each of these symbols the heavy vertical line represents the direction toward the intersection; the heavy line bearing the arrow head, the road to be followed; and the lighter lines the roads to be avoided.

It will be appreciated that my invention adapts itself to a conventional graphic representation of all sorts of crossings and meetings with roads, railroads, streams, etc., and that the several symbols give an accurate description to the user, which he is able to assimilate at a glance, of the essential features which concern him as pilot, giving him his bearings and showing all roads to be avoided as well as the road which he must follow. The function of showing all the roads to be avoided is one of the most valuable and important features of the invention in cases where more than two roads intersect at a common point.

By reference to the specimen route card reproduced in Fig. 1, with my symbols made a part thereof, the value and advantage of my invention will be readily appreciated. The symbols shown in Fig. 1 are designated by the characteristic numerals applied in Fig. 2. Each symbol takes the place of two or more words which would be otherwise necessary to convey the desired information, and it conveys this information to the mind of the user much more quickly and more accurately than it is conveyed by the equivalent words, while occupying only a small fraction of the space required for such words.

What I claim and desire to secure by Letters Patent is:

1. A graphic route guide symbol or character having portions representing graphically the relative positions of roads at an intersection and having a direction indicator to show the route to be followed in travel beyond the intersection.

2. A graphic route guide symbol having lines or portions representing roads at a point of intersection and having means severally differentiating from one another showing the road traveled in reaching the point of intersection, the road to be followed beyond such point, and the road to be avoided at such point.

3. A graphic route guide symbol or character for a printed or written route chart, having elements or portions representing all the roads at a point of intersection of more than four roads and having the portions which represent all of the roads to be avoided at such point clearly distinguished from that representing the road to be followed from such point.

4. A graphic route guide symbol comprising four or more lines meeting at a common point and relatively arranged to represent the relation of a like number of roads at a point of intersection, those lines which represent the road followed in approaching the point of intersection and the road to be traveled away from such point, being heavier than the lines representing the roads to be avoided, and the road to be followed being further distinguished from the road approaching the point of intersection.

5. In a printed or written road guide, a graphic symbol having its lower portion arranged and positioned to represent the direction followed by the traveler in arriving at the location indicated on the guide, and having another portion disposed to designate graphically the position to be followed after passing such point, the said other portion having also a direction indicator.

6. In a printed or written road guide, a graphic symbol having its lower portion arranged and positioned to represent the direction followed by the traveler in arriving at the location indicated on the guide, and having another portion disposed to designate graphically the position to be followed after passing such point, the said other portion having also a direction indicator, said symbol having also lines distinguished in appearance from the aforesaid portions to represent roads to be avoided, and arranged in general similarity to the relative positions of the actual roads to be avoided at the point indicated.

7. A set of graphic route guide symbols representing different arrangements of meeting or intersecting roads, said symbols having branching lines or members corresponding generally to the arrangements of roads which they respectively represent, and the members in each symbol which represent, respectively, the road approaching the meeting point, the road to be followed from such point, and all roads to be avoided at that point, being individually distinguished from one another.

In testimony whereof I have affixed my signature.

FRANKLIN H. GILSON.